United States Patent
Bäurle et al.

(10) Patent No.: US 7,453,710 B2
(45) Date of Patent: Nov. 18, 2008

(54) TRANSFORMERLESS SAFETY ISOLATION IN A POWER SUPPLY USING SAFETY CAPACITORS FOR GALVANIC ISOLATION

(75) Inventors: Stefan Bäurle, San Jose, CA (US); David Michael Hugh Matthews, Sunnyvale, CA (US); Roland S. Saint-Pierre, San Jose, CA (US)

(73) Assignee: Power Integrations, Inc., San Jose, CA (US)

( * ) Notice: Subject to any disclaimer, the term of this patent is extended or adjusted under 35 U.S.C. 154(b) by 78 days.

(21) Appl. No.: 11/412,630

(22) Filed: Apr. 26, 2006

(65) Prior Publication Data

US 2007/0253225 A1 Nov. 1, 2007

(51) Int. Cl.
*H02H 7/125* (2006.01)
(52) U.S. Cl. .................. 363/52; 323/222; 323/364
(58) Field of Classification Search ............. 307/70, 307/72, 82; 323/266, 268, 271, 282, 284, 323/287, 233, 222, 364; 363/15–16, 40, 363/50, 55, 123, 131, 52
See application file for complete search history.

(56) References Cited

U.S. PATENT DOCUMENTS

| | | | | |
|---|---|---|---|---|
| 4,184,197 A | * | 1/1980 | Cuk et al. | 363/16 |
| 4,257,087 A | * | 3/1981 | Cuk | 363/16 |
| 4,635,175 A | * | 1/1987 | Probst | 363/16 |
| 5,396,165 A | * | 3/1995 | Hwang et al. | 323/210 |

(Continued)

FOREIGN PATENT DOCUMENTS

EP 0 696 841 A1 2/1996

(Continued)

OTHER PUBLICATIONS

"Harmonized system of quality assessment for electronic components, Sectional specificaton: Fixed capacitors for electromagnetic interference suppression and connection to the supply mains (Assessment level D)", Document Center, 111 Industrial Road, Suite 9, Belmont, California, 94002-4044, U.S.A., (Feb. 8, 2002), pp. i-ii & 1-52.

(Continued)

*Primary Examiner*—Shawn Riley
(74) *Attorney, Agent, or Firm*—Blakely Sokoloff Taylor & Zafman LLP

(57) ABSTRACT

An apparatus and method are disclosed to provide transformerless safety isolation in a power supply. One example regulated power converter includes input terminals included in a primary circuit of the power converter. Output terminals are included in a secondary circuit of the power converter. A plurality of safety capacitors including first and second safety capacitors are also included. Each of the plurality of safety capacitors includes a respective first terminal coupled to the primary circuit and a respective second terminal coupled to the secondary circuit. The plurality of safety capacitors galvanically isolates the primary circuit from the secondary circuit. A power switch is included in the primary circuit. The power switch is coupled such that switching of the power switch causes energy to transfer between the primary and secondary circuits through the plurality of safety capacitors. Substantially all of the energy that is transferred between the primary and secondary circuits is through the plurality of safety capacitors.

11 Claims, 6 Drawing Sheets

U.S. PATENT DOCUMENTS

| | | | | |
|---|---|---|---|---|
| 6,144,565 | A | * | 11/2000 | Lethellier .................... 363/16 |
| 6,977,803 | B2 | * | 12/2005 | Park ............................ 361/84 |
| 2001/0015648 | A1 | | 8/2001 | Tokita |
| 2005/0083023 | A1 | * | 4/2005 | Wong et al. ................. 323/224 |

FOREIGN PATENT DOCUMENTS

| | | |
|---|---|---|
| JP | 08-023673 | 1/1996 |
| WO | WO 03/075442 A1 | 9/2003 |
| WO | WO 2004/036330 A2 | 4/2004 |

OTHER PUBLICATIONS

Ruan, X., et al., "Voltage-Sharing of the Divided Capacitors in Non-Isolated Three-Level Converters", http://www.paper.edu.cn, Aero-Power Sci-tech Center, College of Automation Engineering, Nanjing University of Aeronautics and Astronautics, Nanjing, 210016, Jiangsu Province, P.R. China, (2004).

"LNK302/304-306, LinkSwitch®-TN Family, Lowest Component Cout, Energy Efficient Off-Line Switcher IC", Power Integrations, 5245 Hellyer Avenue, San Jose, California, U.S.A., (Mar. 2005), pp. 1-16.

"LNK353/354 LinkSwitch®-HF Family—Enhanced, Energy, Efficient, Low Power Off-Line Switcher IC," Power Integrations, Inc., Feb. 2005, pp. 1-16.

EP 07 25 1671—EP Search Report, dated Jun. 6, 2008 (Publication No. EP 1 850 467).

* cited by examiner

TRANSFORMERLESS SAFETY ISOLATION IN A POWER SUPPLY USING SAFETY CAPACITORS FOR GALVANIC ISOLATION

BACKGROUND

1. Technical Field

The present invention relates generally to electronic circuits, and more specifically, the invention relates to circuits in which there is power regulation.

2. Background Information

Electrical devices need power to operate. Many electrical devices are powered using switched mode power converters. Switched mode power converters are often designed to convert an unregulated voltage input to a regulated output voltage. In some applications, the input voltage may be dangerous and safety isolation is therefore required between the input and output of the power converter. One common way to achieve this safety isolation between the input and output of the power converter is to include a transformer in the power converter. The transformer electrically isolates the input of the power converter from the output of the converter and therefore provides protection at the output from the voltage present at the input of the power converter circuit. However, the inclusion of a transformer in a power converter to provide safety isolation adds complexity and cost to the power converter.

BRIEF DESCRIPTION OF THE DRAWINGS

The present invention detailed illustrated by way of example and not limitation in the accompanying Figures.

DETAILED DESCRIPTION

Figure 1:
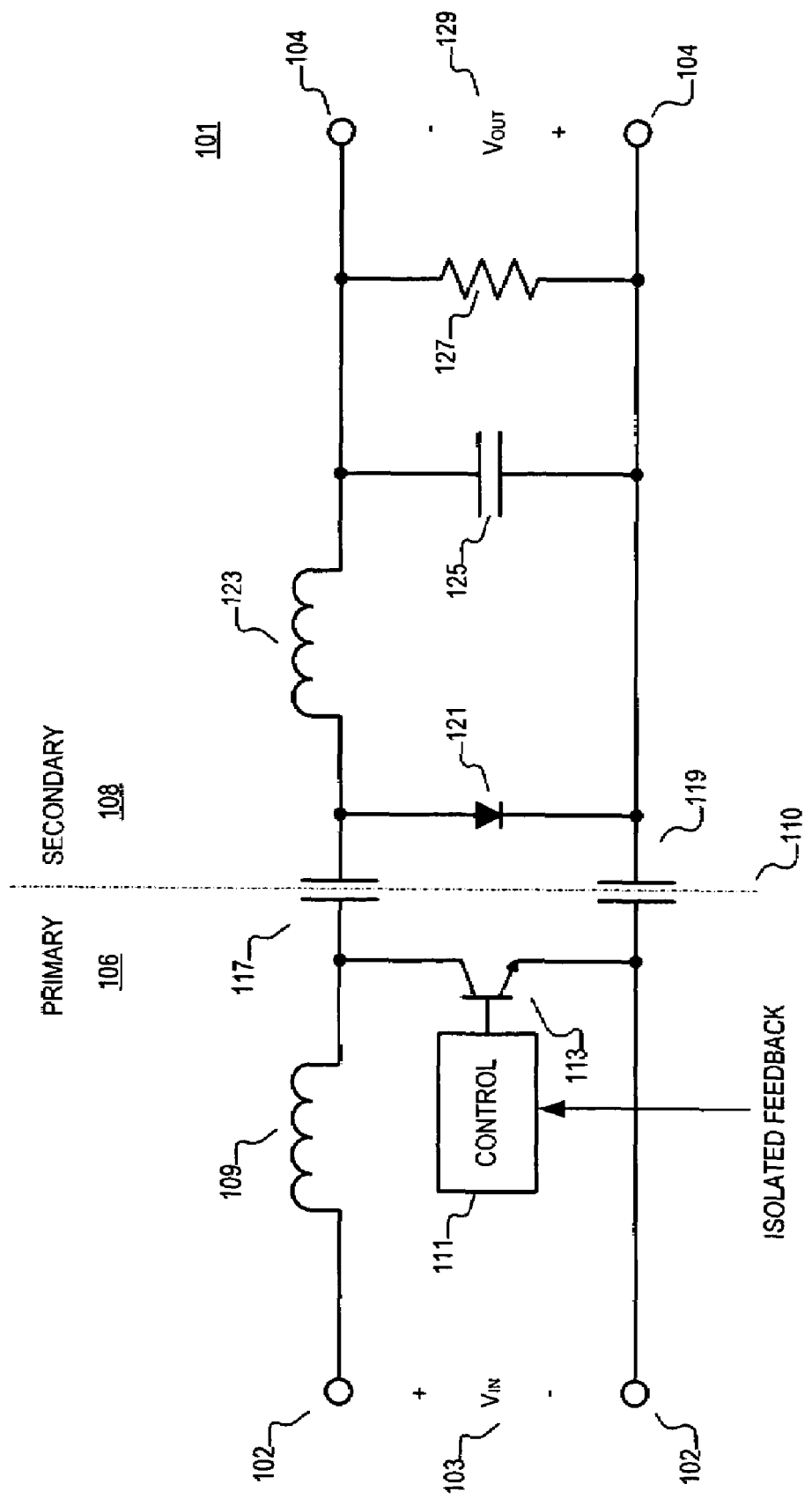
FIG. 1 is a schematic diagram that shows generally an example power supply schematic with transformerless safety isolation in accordance with the teaching of the present invention.

Examples related to power supply regulators with transformerless safety isolation are disclosed. In the following description, numerous specific details are set forth in order to provide a thorough understanding of the present invention. It will be apparent, however, to one having ordinary skill in the art that the specific detail need not be employed to practice the present invention. Well-known methods related to the implementation have not been described in detail in order to avoid obscuring the present invention.

Reference throughout this specification to "one embodiment" or "an embodiment" means that a particular feature, structure, or characteristic described in connection with the embodiment is included in at least one embodiment of the present invention. Thus, the appearances of the phrases "for one embodiment" or "in an embodiment" in various places throughout this specification are not necessarily all referring to the same embodiment. Furthermore, the particular features, structures, characteristics, combinations and/or sub-combinations described below and/or shown in the drawings may be combined in any suitable manner in one or more embodiments in accordance with the teachings of the present invention.

As will be discussed, some example power supply regulators in accordance with the teachings of the present invention utilize capacitive couplings between the input and output terminals of the power converters or power supplies to achieve electrical or galvanic isolation to meet safety requirements without the use of a transformer. To illustrate, FIG. 1 shows an example schematic of a regulated power supply or power converter 101 having input terminals 102 coupled to receive an input voltage $V_{IN}$ 103 and isolated output terminals 104 coupled to provide a regulated output, such as for example voltage $V_{OUT}$ 129.

In the illustrated example, the power converter includes a plurality of safety capacitors 117 and 119 coupled between a primary circuit 106 and a secondary circuit 108. In one example, an inductor 109 is included in primary circuit 106 and is coupled to safety capacitor 117 and a power switch 113, which in the illustrated example is also coupled to safety capacitor 119. In the illustrated example, power switch 113 coupled to switch under the control of control circuit 111 in response to isolated feedback 115 to regulate an output quantity at the output terminals of the secondary circuit 108 in accordance with the teachings of the present invention. For the purposes of this disclosure, the term "isolated feedback" means that the feedback received by the control circuit 111 is electrically isolated from the output terminals or the secondary circuit 108 of the power converter 101 in accordance with the teachings of the present invention. In various examples, the electrical isolation of the isolated feedback 115 may be realized with primary-side regulation or for example with the use of an optocoupler or another suitable alternative in accordance with the teachings of the present invention.

As mentioned, a plurality of safety capacitors, or isolation capacitors, are included in the power converter 101 to provide galvanic isolation between the primary and secondary circuits of the power converter in accordance with the teachings of the present invention. In particular, the dielectric regions of the plurality of safety capacitors 117 and 119 provide an isolation barrier 110 between the primary and secondary circuits 106 and 108 of the power converter 101 in accordance with the teachings of the present invention. As a result, a direct current (DC) voltage between the input terminals 102 of power converter 101 and output terminals 104 of power converter 101 will produce no DC current between the input terminals 102 of power converter 101 and output terminals 104 for any state of any switch on the power converter. Instead, the input terminals 102 are galvanically isolated from the output terminals 104 of power converter 101 with the inclusion of the isolation barrier 110 provided with the safety capacitors in accordance with the teachings of the present invention. Therefore, in the example illustrated in FIG. 1, all circuitry in power converter 101 to the left of isolation barrier 110, which is not galvanically isolated from input terminals 102 is referred to as the primary circuit 106. Similarly, all circuitry in power converter 101 to the right of isolation barrier 110, which is not galvanically isolated from output terminals 104 is referred to as the secondary circuit 108.

In operation, no DC electrical current can flow directly between the input and output terminals 102 and 104 of power converter 101 since there are no DC electrical connections between the input and output terminals 102 and 104. However, the plurality of isolation or safety capacitors 117 and 119 still serve as energy transfer capacitors and allow energy to flow between the input terminals 102 and the output terminals 104 of power converter 101 through the isolation barrier 110 via the capacitive coupling provided by the plurality of isolation or safety capacitors 117 and 119 in response to the switching of the power switch 113. In operation, substantially all energy that is transferred between the primary and secondary circuits 106 and 108 of the power converter 101 is transferred through the isolation barrier 110 through the plurality of isolation or safety capacitors 117 and 119 in accordance with the teachings of the present invention. Therefore, power converter 101 provides regulated power with transformerless safety isolation of input terminals 102 from output terminals 104 in accordance with the teaching of the present invention.

In one example, the safety isolation capacitors are Y capacitors such as Y1 safety capacitors or the like, which are specifically designed and structured to provide isolation as defined by standards documents such as for example British Standard BS EN 132400:1995. For example, depending on the application, a circuit designer would use Y1 safety capacitors for safety capacitors 117 and 119 having the smallest values that would provide acceptable performance in accordance with the teachings of the present invention.

In the example of FIG. 1, diode 121 is coupled to inductor 123, which is coupled to capacitor 125 and resistor 127 in the secondary circuit 208 as shown. In the illustrated example, inductor 123 is an energy transfer element through which the flow of energy is controlled by the switching of power switch 113 under the control of control circuit 111 in response to the isolated feedback 115. In one example, power switch 113 is a transistor and isolated feedback 115 is a signal representative of the output of power converter 101, but is electrically isolated from the output of power converter 101. In operation, control circuit 111 switches power switch 113 to regulate the transfer of energy from the input terminals 102 though safety capacitors 117 and 119 and through inductor 123 to regulate an output quantity at the output terminals 104 of power converter 101 in accordance with the teachings of the present invention. The regulated output quantity may include the output voltage, such as for example $V_{OUT}$ 129 across resistor 127, or an output current at the output terminals 104 of power converter 101, or any combination thereof.

Figure 2:
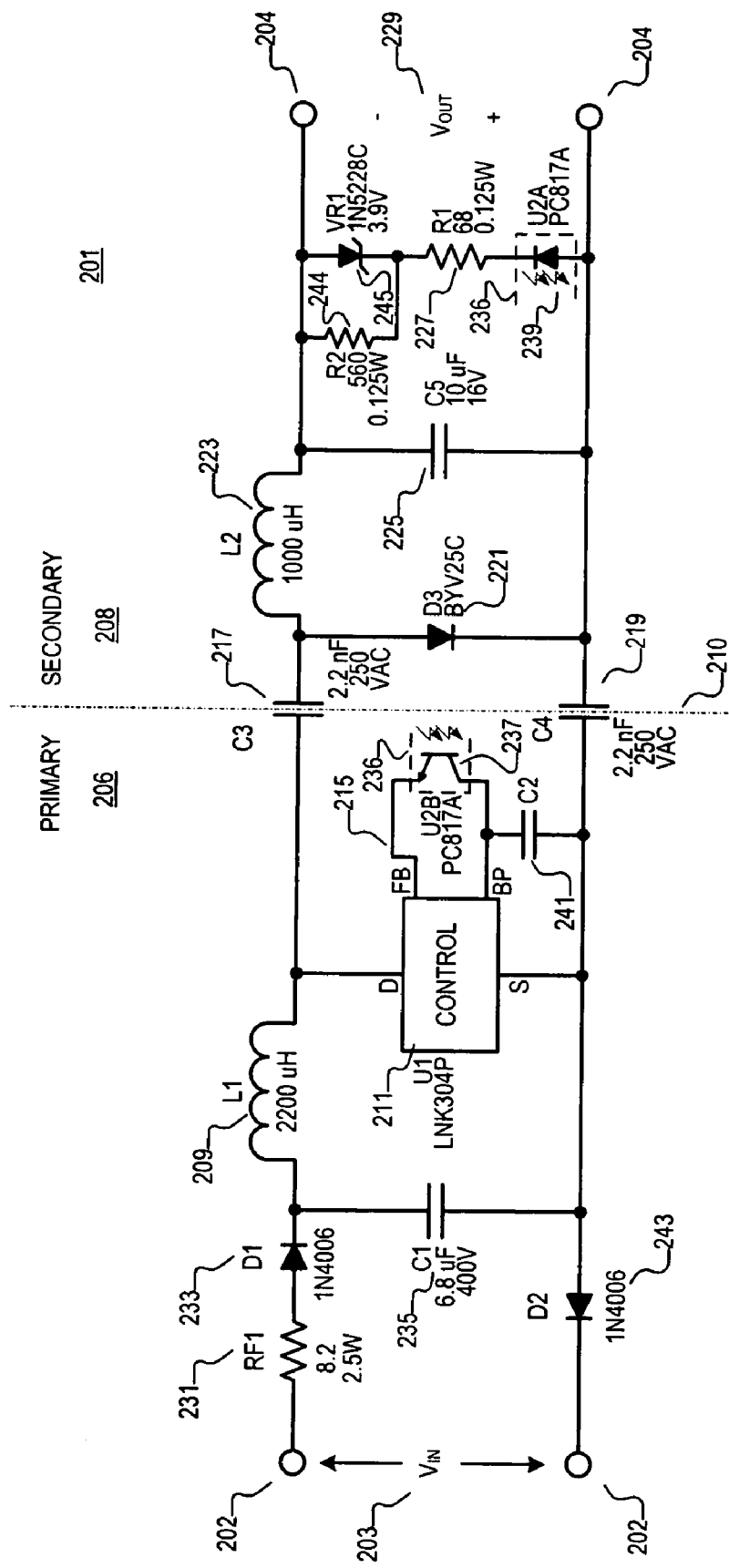
FIG. 2 is a schematic diagram that shows generally an example with increased detail of a power supply schematic with transformerless safety isolation in accordance with the teaching of the present invention.

FIG. 2 is another schematic diagram that shows generally an example with increased detail of a power converter 201 with transformerless safety isolation in accordance with the teaching of the present invention. As shown in the depicted example, power converter 201 shares some similarities with the power converter 101 of FIG. 1 in accordance with the teachings of the present invention. In the illustrated example, power converter 201 includes input terminals 202 coupled to receive $V_{IN}$ 203. In the illustrated example, input voltage $V_{IN}$ 203 in FIG. 2 is an alternating current (AC) voltage. In the illustrated example, diode D1 233, diode D2 243, fusible resistor RF1 231 and capacitor C1 235 are coupled to the input of power converter 201 to provide a substantially DC voltage on capacitor C1 235.

An inductor 209 is included on the input side of power converter 201 and a controller 211 that includes a power switch is coupled to switch in response to an isolated feedback signal 215 to regulate the output of power converter 201. In the illustrated example, controller 211 is a LNK304P power supply controller from the LinkSwitch-TN family of power supply integrated circuits from Power Integrations, Inc. of San Jose, Calif. The LNK304P employs a control scheme known as on/off control. It is understood that other common control schemes including PWM current mode, PWM voltage mode, self oscillating, hysteretic, resonant, quasi resonant, and other variable frequency control schemes could be used while still benefiting from the teachings of the present invention. It is noted, therefore, that other suitable power supply controllers or switching devices could also be employed instead of the LNK304P power supply integrated circuit in accordance with the teachings of the present invention.

As shown in the depicted example, a capacitor C2 241 is coupled to the bypass terminal BP of controller 211 and the feedback terminal FB of controller 211 is coupled to receive the isolated feedback 215 from the transistor 237 portion of optocoupler 236. As shown, the light emitting diode (LED) 239 portion of optocoupler 236 is coupled to the output of power converter 201 to sense an output quantity of power converter 201, such as for example $V_{OUT}$ 229.

On the output side of the example power converter 201 illustrated in FIG. 2, an inductor L2 223 is coupled to diode D3 221 and a capacitor C5 225 as shown. A Zener diode VR1 245, a resistor R1 227 and the LED 239 portion of optocoupler 236 are coupled across the output terminals 204 of power converter 201 as shown. In addition, the example illustrated in FIG. 2 also shows a resistor R2 244 is coupled across Zener diode VR1. In the illustrated example, inductor 223 is an energy transfer element through which the flow of energy is controlled by the switching of a power switch included in controller 211 in response to the isolated feedback 215 in accordance with the teachings of the present invention.

In order to isolate the input and output terminals 202 and 204 of power converter 201, isolation or safety capacitors are included C3 217 and C4 219 as shown to provide an isolation barrier 210 with their respective dielectric regions to provide galvanic isolation in accordance with the teachings of the present invention. As shown, safety capacitor C3 217 and safety capacitor C4 219 are coupled between the primary circuit 206 and secondary circuit 208 in the power converter 201. In the illustrated example, safety capacitors 217 and 219 are Y1 safety capacitors as well as energy transfer capacitors in power converter 201 in accordance with the teachings of the present invention.

The capacitive coupling provided by capacitors 217 and 219 enable the transfer of energy between the input terminals 202 and the output terminals 204 through the isolation barrier 210 of power converter 201 in accordance with the teachings of the present invention. In addition, the isolation provided by the isolation barrier 210 provided by the dielectric regions of capacitors 217 and 219 provide safety isolation without a transformer in power converter 201 in accordance with the teachings of the present invention. In operation, controller 211 switches an internal power switch to regulate the transfer of energy from the input terminals 202 though the isolation barrier 210 provided by the safety capacitors 217 and 219 and through inductor 223 to regulate an output quantity at the output terminals 204 of power converter 201 in accordance with the teachings of the present invention. Therefore, power converter 201 provides regulated power with transformerless safety isolation of input terminals 202 from output terminals 204 in accordance with the teaching of the present invention In the specific example shown in FIG. 2, safety capacitors 217 and 219 are 2.2 nF capacitors rated at 250 VAC. It is appreciated that capacitors having different capacitance values could be employed so long as the capacitors provide safety isolation and transfer energy between the input and output terminals 202 and 204 as discussed above in accordance with the teachings of the present invention. In one example, it is noted a user would use the smallest values that give acceptable performance in generic low power uses for a given application in accordance with the teachings of the present invention.

Figure 3:
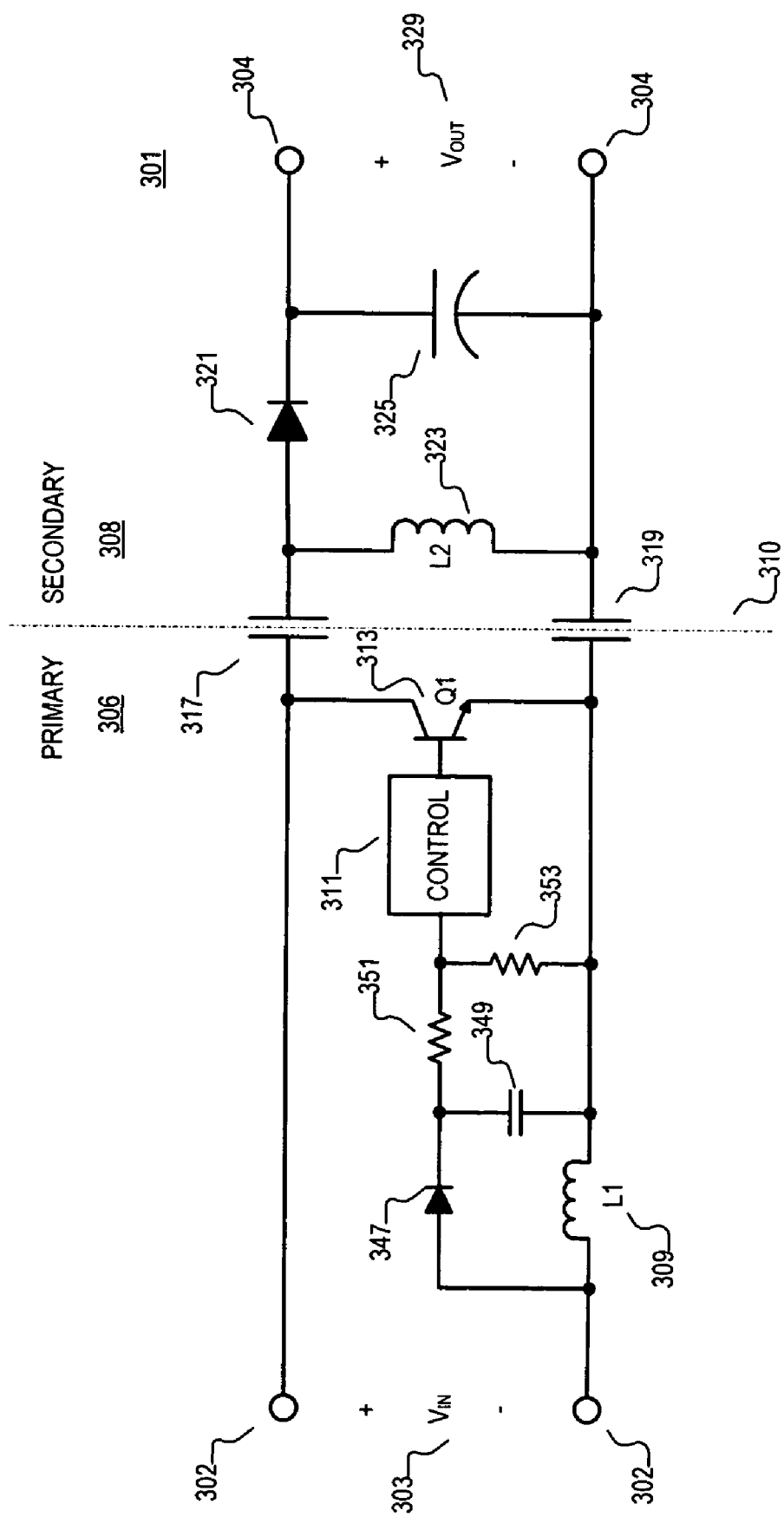
FIG. 3 is a schematic diagram that shows generally another example power supply schematic with transformerless safety isolation in accordance with the teaching of the present invention.

FIG. 3 shows generally an example of a primary regulated capacitively isolated power converter 301 with transformerless safety isolation in accordance with the teaching of the present invention. As shown in the depicted example, power converter 301 shares some similarities with the power converters shown in FIGS. 1 and 2 in accordance with the teachings of the present invention. In the illustrated example, power converter 301 includes input terminals 302 coupled to receive $V_{IN}$ 303. In the illustrated example, a primary circuit 306 and a secondary circuit 308 are included in the power converter 301. As shown, a plurality of safety capacitors including safety capacitor 317 and 319 are coupled between the primary and secondary circuits 306 and 308. The dielectric regions of the plurality of safety capacitors 317 and 319 form an isolating barrier 310, which galvanically isolates the primary circuit 306 from secondary circuit 308. A power transistor Q1 313 is included in primary circuit 306, which is coupled to be switched in response to control circuit 311 to regulate the transfer of energy between the primary and secondary circuits. All energy that is transferred between the primary and secondary circuits is through the isolating barrier 310 through plurality of safety capacitors 317 and 319 in accordance with the teachings of the present invention.

In the illustrated example, primary side regulation is realized with circuit elements inductor L1 309, diode 347 and capacitor 349 coupled as shown to provide control information to the controller input of control circuit 311. In one example, a resistor divider network including for example resistors 351 and 353 may optionally be included to provide the control information to the controller input of the control circuit 311 in accordance with the teachings of the present invention. In the secondary circuit 308, inductor L2 323, diode 321 and capacitor 325 are coupled as shown at the output of power converter 301 to provide a regulated output quantity $V_{OUT}$ 329 at the output terminals 304 in accordance with the teachings of the present invention.

Figure 4:
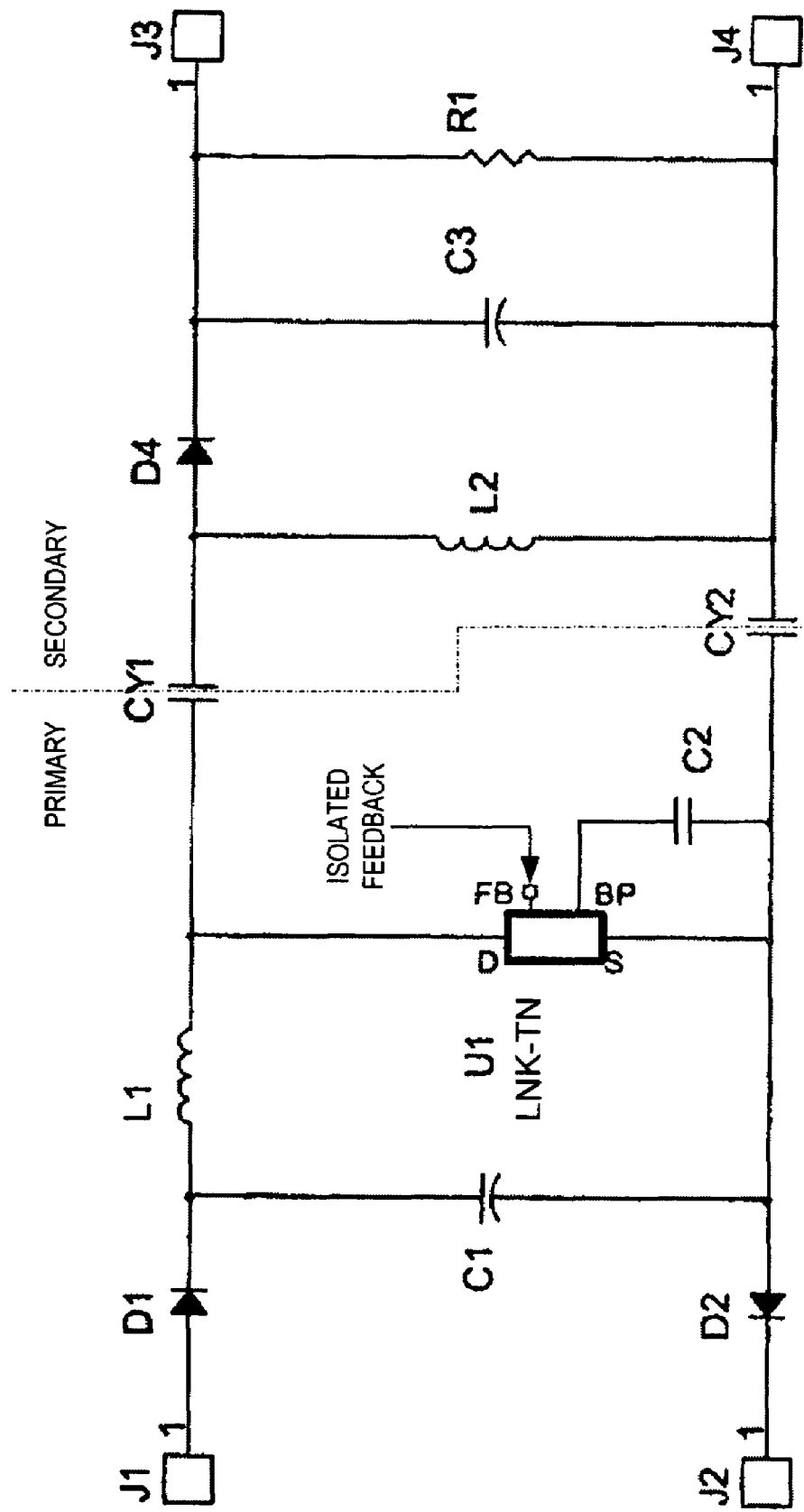
FIG. 4 is a schematic diagram that shows generally yet another example power supply schematic with transformerless safety isolation in accordance with the teaching of the present invention.
Figure 5:
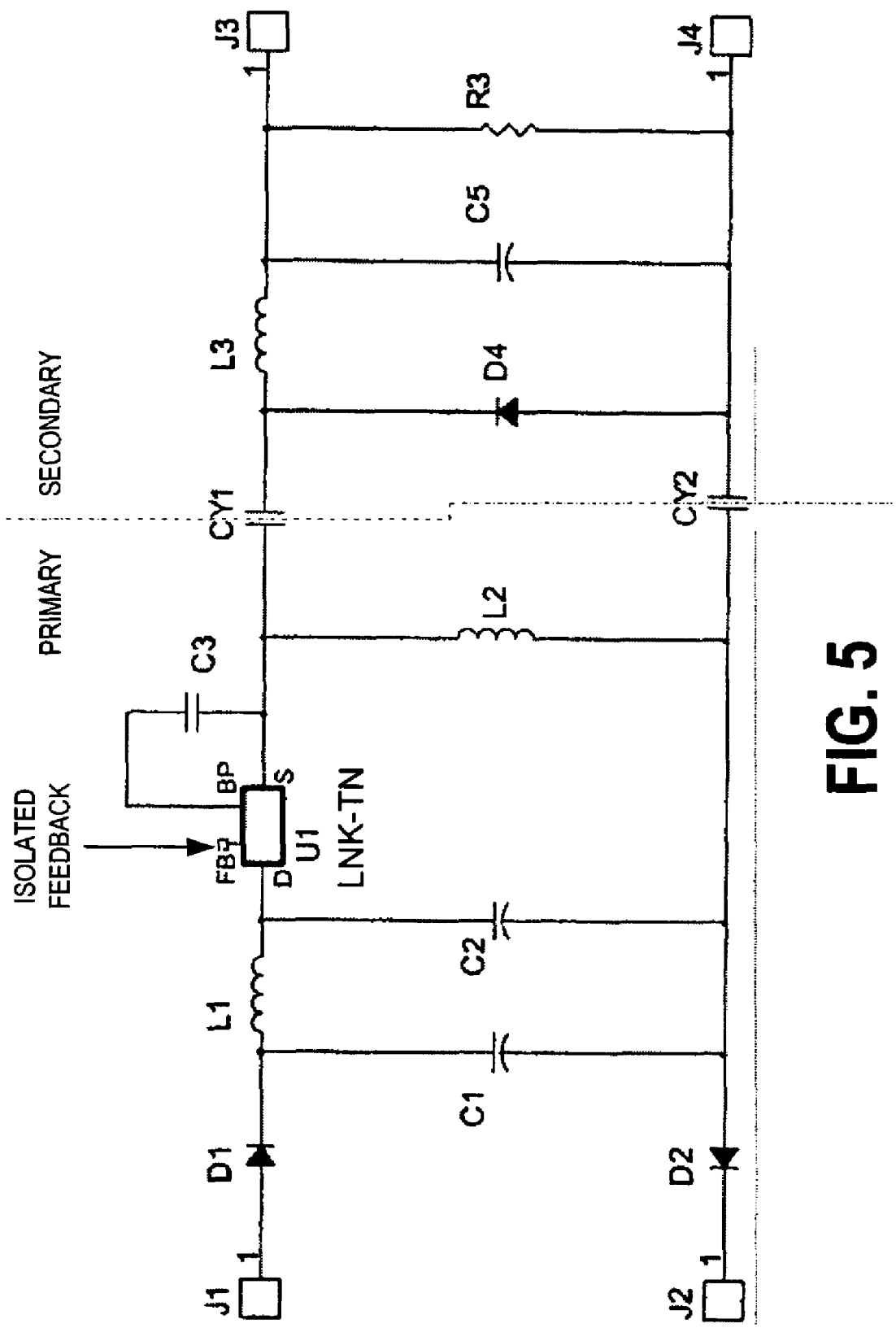
FIG. 5 is a schematic diagram that shows generally still another example power supply schematic with transformerless safety isolation in accordance with the teaching of the present invention.
Figure 6:
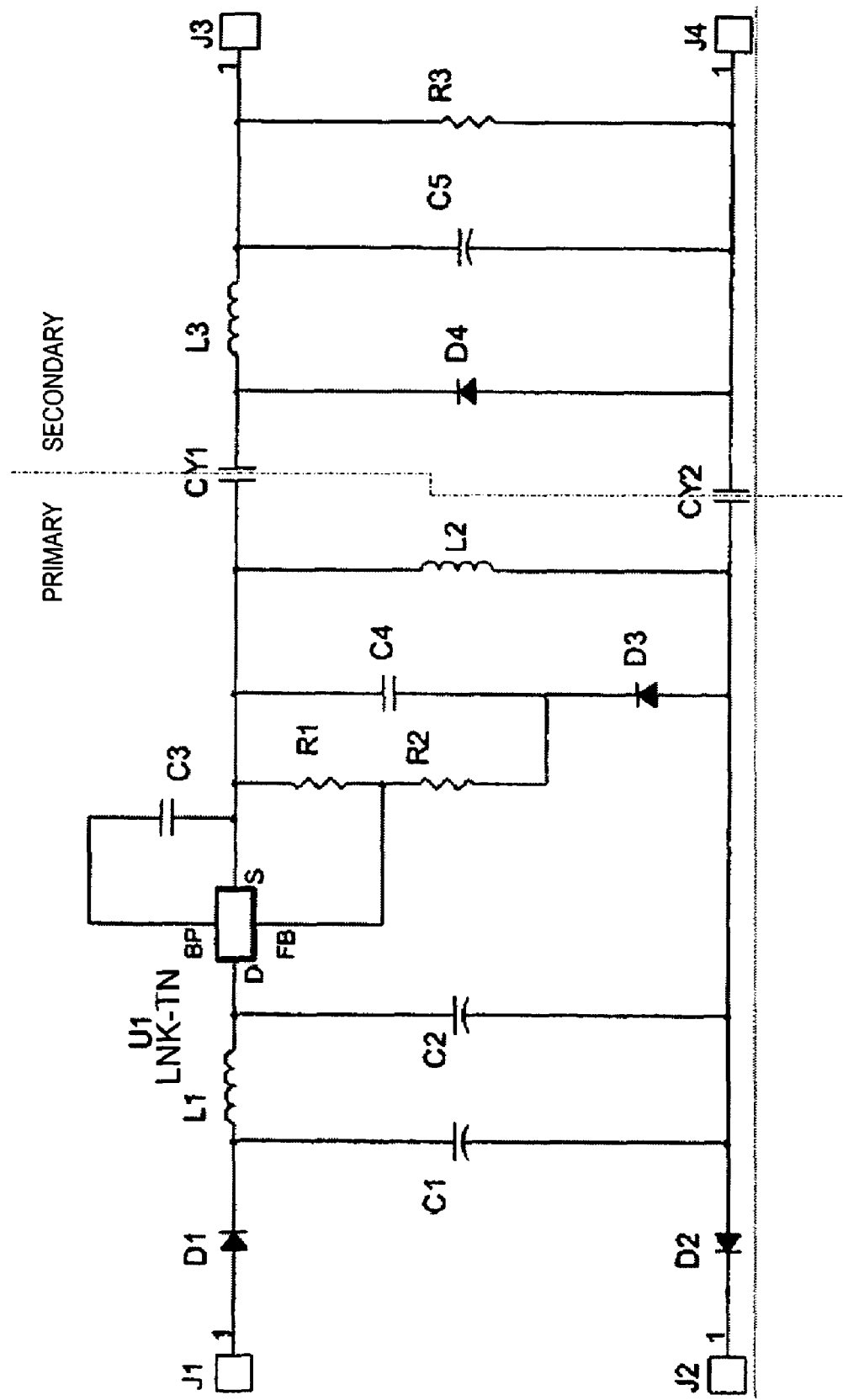
FIG. 6 is a schematic diagram that shows generally another example power supply schematic with transformerless safety isolation in accordance with the teaching of the present invention.

FIGS. 4-6 illustrate generally schematics of other capacitively isolated power converters with transformerless safety isolation in accordance with the teaching of the present invention. As shown in the depicted examples, the power converters shown in FIGS. 4-6 share some similarities with the power converters shown in FIGS. 1-3 in accordance with the teachings of the present invention. In the illustrated examples, each power converter of the example power converters depicted in FIGS. 4-6 includes a plurality of safety capacitors CY1 and CY2 coupled between the primary and secondary circuits. The isolation barrier formed with the dielectric regions of the plurality of safety capacitors CY1 and CY2 galvanically isolate the primary and secondary circuits in accordance with the teachings of the present invention.

As shown, each of the example power converters depicted in FIGS. 4-6 employs a power supply controller U1 included in the primary circuit side of the respective power converter to regulate the transfer of energy between the primary and secondary circuits through the safety capacitors of each respective power converter. In the example illustrated in FIG. 6, the power supply controller U1 is coupled in a primary side regulation scheme and in the examples illustrated in FIGS. 4-5, the power supply controller U1 is coupled to receive isolated feedback. Therefore, in each example shown, the primary and secondary circuits are galvanically isolated and all energy that is transferred between the primary and secondary circuits is through the isolation barrier through plurality of safety capacitors in accordance with the teachings of the present invention.

In each illustrated example, power controller U1 is a LNK-TN power supply controller from the LinkSwitch-TN family of power supply integrated circuits from Power Integrations, Inc. of San Jose, Calif. Similar to the example described in FIG. 2, the LNK-TN power supply controller included in the specific examples shown in FIGS. 4-6 employs a control scheme known as on/off control. It is understood that other common control schemes including PWM current mode, PWM voltage mode, self oscillating, hysteretic, resonant, quasi resonant, and other variable frequency control schemes could be used while still benefiting from the teachings of the present invention. It is noted, therefore, that other suitable power supply controllers or switching devices could also be employed instead of the LNK-TN power supply integrated circuit in accordance with the teachings of the present invention.

In the foregoing detailed description, the methods and apparatuses of the present invention have been described with reference to a specific exemplary embodiment thereof. It will, however, be evident that various modifications and changes may be made thereto without departing from the broader spirit and scope of the present invention. The present specification and figures are accordingly to be regarded as illustrative rather than restrictive.

What is claimed is:

1. A power converter, comprising:

input terminals included in a primary circuit of the power converter;

output terminals included in a secondary circuit of the power converter;

a plurality of safety capacitors including first and second safety capacitors, wherein each of the plurality of safety capacitors includes a respective first terminal coupled to the primary circuit and a respective second terminal coupled to the secondary circuit such that the plurality of safety capacitors galvanically isolates the primary circuit from the secondary circuit;

a first inductor included in the primary circuit and coupled to the first terminal of the first safety capacitor;

a second inductor included in the secondary circuit and coupled to the second terminal of the first safety capacitor, wherein the first inductor and the second inductor are non-coupled inductors that are substantially non-mutually inductive;

a third inductor included in the primary circuit and coupled between the first terminal of the first safety capacitor and the first terminal of the second safety capacitor: and a power switch included in the primary circuit, wherein the power switch is coupled such that switching of the power switch causes energy to transfer between the primary and secondary circuits through the plurality of safety capacitors such that substantially all of the energy that is transferred between the primary and secondary circuits is through the plurality of safety capacitors.

2. The power converter of claim 1 wherein the first and second safety capacitors comprise Y safety capacitors.

3. The power converter of claim 1 further comprising a control circuit coupled to regulate the switching of the switch in response to an isolated feedback signal.

4. The power converter of claim 3 further comprising an optocoupler coupled to the output terminals to generate the isolated feedback signal coupled to be received by the control circuit to regulate an output quantity of the power converter.

5. The power converter of claim 1 wherein the galvanic isolation between the primary and secondary circuits of the power converter is maintained for any state of any switch in the power converter.

6. The power converter of claim 1 wherein the galvanic isolation between the primary and secondary circuits of the power converter is provided with an isolating barrier formed with dielectric regions of the plurality of safety capacitors between the primary circuit and the secondary circuit.

7. The power converter of claim 1, wherein the output terminals include a positive output terminal and a negative output terminal, wherein the second inductor is coupled between the second terminal of the first safety capacitor and the negative output terminal.

8. The power converter of claim 7, wherein the second inductor includes a first terminal and a second terminal, wherein the first terminal of the second inductor is directly coupled to the second terminal of the first safety capacitor, and wherein the second terminal of the second inductor is directly coupled to the negative output terminal.

9. The power converter of claim 1, further comprising a diode coupled between the second terminal of the first safety capacitor and the second terminal of the second safety capacitor.

10. The power converter of claim 9, wherein the diode includes a first terminal and a second terminal, wherein the first terminal of the diode is directly coupled to the second terminal of the first safety capacitor, and wherein the second terminal of the diode is directly coupled to the second terminal of the second safety capacitor.

11. The power converter of claim 1, wherein the power switch includes a drain terminal coupled to the first inductor and wherein the power switch further includes a source terminal coupled to the third inductor and the first terminal of the first safety capacitor.

* * * * *